United States Patent
Rivera

(10) Patent No.: US 11,534,018 B2
(45) Date of Patent: *Dec. 27, 2022

(54) BEVERAGE BREWER WITH BREWING MATERIAL ROTATION

(71) Applicant: Adrian Rivera, Whittier, CA (US)

(72) Inventor: Adrian Rivera, Whittier, CA (US)

(*) Notice: Subject to any disclaimer, the term of this patent is extended or adjusted under 35 U.S.C. 154(b) by 496 days.

This patent is subject to a terminal disclaimer.

(21) Appl. No.: 16/586,874

(22) Filed: Sep. 27, 2019

(65) Prior Publication Data

US 2020/0154932 A1  May 21, 2020

Related U.S. Application Data

(63) Continuation-in-part of application No. 15/345,056, filed on Nov. 7, 2016, now Pat. No. 10,455,972.

(60) Provisional application No. 62/251,568, filed on Nov. 5, 2015.

(51) Int. Cl.
| | |
|---|---|
| *A47J 31/36* | (2006.01) |
| *A47J 31/44* | (2006.01) |
| *A47J 31/20* | (2006.01) |
| *A47J 31/40* | (2006.01) |
| *A47J 31/06* | (2006.01) |

(52) U.S. Cl.
CPC ....... *A47J 31/3628* (2013.01); *A47J 31/0673* (2013.01); *A47J 31/20* (2013.01); *A47J 31/407* (2013.01); *A47J 31/4403* (2013.01); *A47J 31/3695* (2013.01)

(58) Field of Classification Search
CPC ........ A47J 31/0673; A47J 31/20; A47J 31/22; A47J 31/369; A47J 31/3695
USPC ........................................ 99/287, 295, 302 C
See application file for complete search history.

(56) References Cited

U.S. PATENT DOCUMENTS

| | | |
|---|---|---|
| 1,648,983 A | 11/1927 | Elrod |
| 1,887,848 A | 11/1928 | Peirce |
| 1,984,047 A | 12/1934 | Thieme |
| 2,858,762 A | 11/1958 | Wade |
| 5,265,517 A | 11/1993 | Gilbert |
| 5,472,719 A | 12/1995 | Favre |
| 5,957,035 A | 9/1999 | Richter |

(Continued)

FOREIGN PATENT DOCUMENTS

| | | |
|---|---|---|
| CN | 103356068 A | 10/2013 |
| DE | 4302899 A1 | 3/1994 |

(Continued)

*Primary Examiner* — Reginald Alexander
(74) *Attorney, Agent, or Firm* — IP Strategies

(57) ABSTRACT

A beverage brewer includes a brewing chamber, a hollow injection nozzle, a rotation member, and a motor. The brewing chamber is configured to receive and hold a brewing cartridge. The injection nozzle is arranged in fluid communication with a liquid supply and configured to enter a brewing cartridge when the brewing cartridge is disposed in the brewing chamber and to provide fluid communication from the liquid supply to an interior of the brewing cartridge. The rotation member is arranged at a periphery of the brewing chamber. The motor is configured to rotate the rotation member. The beverage brewer can also include a hollow extraction nozzle arranged opposite an opening of the brewing chamber and configured to enter the brewing cartridge when the brewing cartridge is disposed in the brewing chamber and to provide fluid communication from an interior of the brewing cartridge to an exterior of the brewing chamber.

29 Claims, 4 Drawing Sheets

(56) References Cited

U.S. PATENT DOCUMENTS

| | | |
|---|---|---|
| 6,272,974 B1 | 8/2001 | Pascotti et al. |
| 7,322,274 B2 | 1/2008 | Wang |
| 7,353,751 B2 | 4/2008 | Takizawa |
| 8,857,317 B2 | 10/2014 | Manser et al. |
| 2007/0056447 A1 | 3/2007 | Swartz et al. |
| 2009/0280219 A1 | 11/2009 | Yoakim et al. |
| 2014/0202338 A1 | 7/2014 | Remo et al. |
| 2015/0099045 A1 | 4/2015 | Perentes et al. |
| 2015/0327718 A1 | 11/2015 | Burrows |
| 2016/0367072 A1 | 12/2016 | Boone et al. |
| 2017/0332824 A1 | 11/2017 | Ballezzi |
| 2019/0059634 A1 | 2/2019 | Jacobs |

FOREIGN PATENT DOCUMENTS

| | | |
|---|---|---|
| EP | 2119383 A1 | 11/2009 |
| EP | 2133008 A1 | 12/2009 |
| WO | 2013160269 A1 | 10/2013 |

BEVERAGE BREWER WITH BREWING MATERIAL ROTATION

CROSS-REFERENCE TO RELATED APPLICATIONS

This is a continuation-in-part of co-pending U.S. patent application Ser. No. 15/345,056, which was filed on Nov. 7, 2016, which claims priority from U.S. Provisional Application for Patent No. 62/251,568, which was filed on Nov. 5, 2015, the entire disclosures of which are incorporated herein in their entireties by this reference.

FIELD OF THE INVENTION

The invention relates to beverage brewing and in particular to apparatus and methods of providing rotating water dispersion into a brewing chamber.

BACKGROUND OF THE INVENTION

Brewed beverages are often prepared by injecting water into a brewing chamber containing brewing material, such as ground coffee beans, an herbal preparation, or tea leaves. Conventional brewers inject water into the brewing material to brew the beverage, such as by inserting a hollow needle into the brewing material to direct the water from a reservoir or other source. However, water released or sprayed into the brewing material tends to form channels or pockets of wetted brewing material, and the resulting brewed beverage is not uniformly or optimally extracted from the brewing material.

BRIEF SUMMARY OF THE INVENTION

The invention is a method of brewing a beverage, as well as an apparatus that produces a dispersed spray and/or a rotating brewing chamber. Novel aspects of the invention prevent or reduce the formation of channels or clumping of the brewing material during the brewing process, thus providing better extraction of brewed beverage from the brewing material.

According to an aspect of the invention, a beverage brewer includes a brewing chamber, a hollow injection nozzle, a rotation member, and a motor. The brewing chamber is configured to receive and hold a brewing cartridge. The injection nozzle is arranged in fluid communication with a liquid supply and is configured to enter a brewing cartridge when the brewing cartridge is disposed in the brewing chamber and to provide fluid communication from the liquid supply to an interior of the brewing cartridge. The rotation member is arranged at a periphery of the brewing chamber. The motor is configured to rotate the rotation member.

The motor can be disposed, for example, in a body of the beverage brewer.

The injection nozzle can include a sidewall having a plurality of ports providing fluid communication from a hollow interior of the injection nozzle to space outside of the injection nozzle.

The injection nozzle can be an injection needle configured to pierce a sealed brewing cartridge when the brewing cartridge is disposed in the brewing chamber.

The beverage brewer can also include a hollow extraction nozzle arranged opposite an opening of the brewing chamber and configured to enter the brewing cartridge when the brewing cartridge is disposed in the brewing chamber and to provide fluid communication from an interior of the brewing cartridge to an exterior of the brewing chamber. For example, the extraction nozzle can be an extraction needle configured to pierce the brewing cartridge when the brewing cartridge is disposed in the brewing chamber.

The beverage brewer can also include a lid configured to selectively cover the brewing chamber. The rotation member can be a pad attached to the lid and arranged to press on the brewing cartridge when the brewing cartridge is disposed in the brewing chamber and the lid covers the brewing chamber. The pad can be configured to cause the brewing cartridge to rotate within the brewing chamber with rotation of the pad. The motor can be arranged, for example, in the lid. The injection nozzle can extend through the pad and into an interior of the brewing chamber when the lid covers the brewing chamber.

The beverage brewer can also include a roller disposed at a sidewall of the brewing chamber such that at least a portion of the roller extends within an interior of the brewing chamber, is arranged to contact the brewing cartridge when the brewing cartridge is disposed in the brewing chamber, and is configured to rotate with movement of the brewing cartridge within the brewing chamber. The beverage brewer can include a number of such rollers.

The rotation member can be a roller disposed at a sidewall of the brewing chamber such that at least a portion of the roller extends within an interior of the brewing chamber and is arranged to press against the brewing cartridge when the brewing cartridge is disposed in the brewing chamber. The roller can be configured to contact the brewing cartridge and cause the brewing cartridge to rotate within the brewing chamber. The rotation member can be a number of such rollers.

The beverage brewer can also include a cradle rotatably coupled within the brewing chamber, configured to hold the brewing cartridge stationary within the cradle. The rotation member can be a roller disposed at a sidewall of the brewing chamber such that at least a portion of the roller extends within an interior of the brewing chamber and is arranged to press against the cradle when the brewing cartridge is disposed in the brewing chamber. The roller can be configured to contact and rotate the cradle, thereby rotating the brewing cartridge within the brewing chamber. The cradle can include a bottom opening configured to allow passage of an extraction nozzle.

The rotation member can be a cradle rotatably coupled within the brewing chamber, configured to hold the brewing cartridge stationary within the cradle and to rotate the brewing cartridge with rotation of the cradle. The cradle can include a bottom opening configured to allow passage of an extraction nozzle.

The rotation member can be a pad disposed at a surface of the brewing chamber opposite an opening of the brewing chamber and arranged to contact the brewing cartridge when the brewing cartridge is disposed in the brewing chamber. The pad can be configured to rotate the brewing cartridge within the brewing chamber.

The beverage brewer can also include a cradle configured to hold the brewing cartridge within the brewing chamber while the cradle is movable within the brewing chamber. The rotation member can be a pad disposed at a surface of the brewing chamber opposite an opening of the brewing chamber and arranged to contact the cradle when the brewing cartridge is disposed in the brewing chamber within the cradle. The pad can be configured to rotate the brewing cartridge with the cradle within the brewing chamber. The cradle can include a bottom opening configured to allow passage of an extraction nozzle.

According to another aspect of the invention, a beverage brewer includes stationary holding means for receiving and supporting a sealed brewing cartridge, injection means, arranged in fluid communication with a liquid supply means, for entering a brewing cartridge disposed in the holding means and for providing fluid communication from the liquid supply means to an interior of the brewing cartridge, rotation means arranged at a periphery of the holding means, and a motor configured to rotate the rotation means.

The beverage brewer can also include extraction means arranged opposite an opening of the stationary holding means and configured to enter the brewing cartridge when the brewing cartridge is disposed in the stationary holding means and to provide fluid communication from an interior of the brewing cartridge to an exterior of the stationary holding means.

BRIEF DESCRIPTION OF THE DRAWINGS

FIG. 1C is a top view of an exemplary beverage brewer according to the invention.

Corresponding reference characters indicate corresponding components throughout the several views of the drawings.

DETAILED DESCRIPTION OF THE INVENTION

Figure 1A:
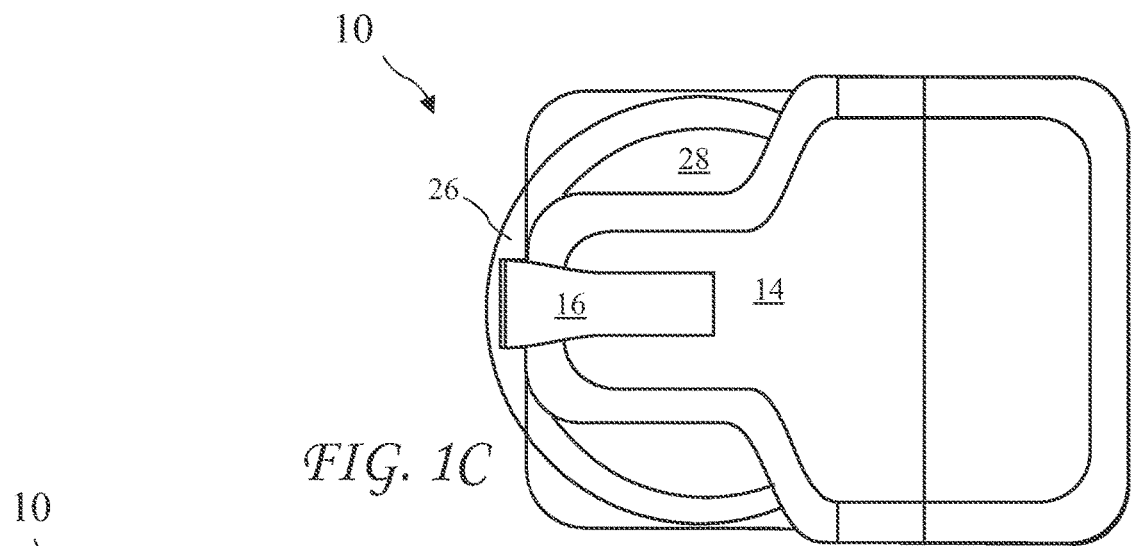
FIG. 1A is a front view of an exemplary beverage brewer according to the invention.
Figure 1B:
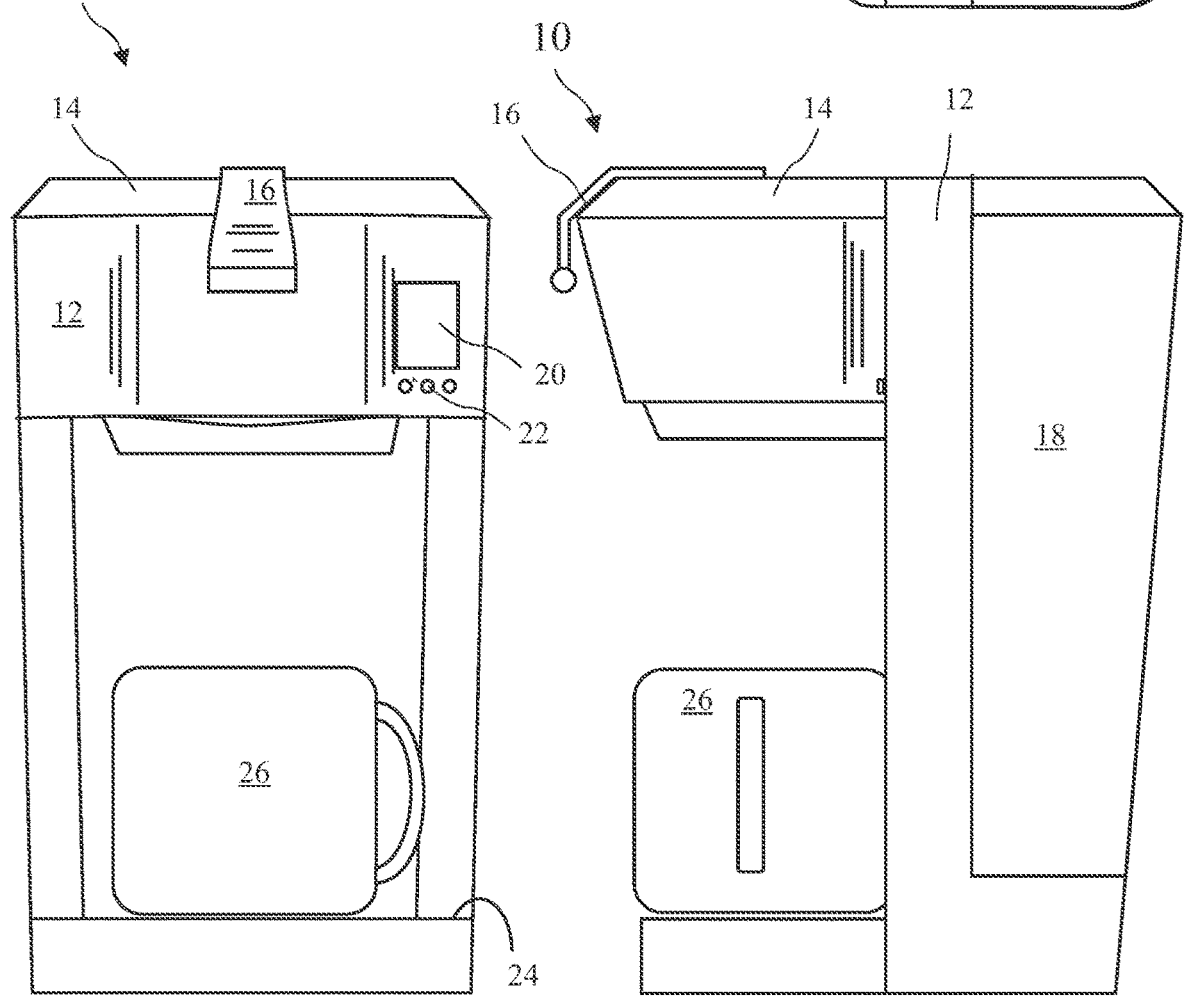
FIG. 1B is a side view of an exemplary beverage brewer according to the invention.

Referring to FIGS. 1A-1C, an exemplary beverage brewer 10 includes a body 12, a lid 14, a lid handle 16, a water reservoir 18, a display 20, control buttons 22, and platform 24 on which a cup 26 or other container can be placed. The beverage brewer 10 provides a flow of water from the reservoir 18 through brewing material to produce a brewed beverage. The water can be heated prior to wetting the brewing material by one of any known means, for example, an electrical heating coil, inductive heating, or a conductive coating on tubing carrying the water, or unheated water can be circulated through the beverage material to brew the beverage.

Figure 2A:
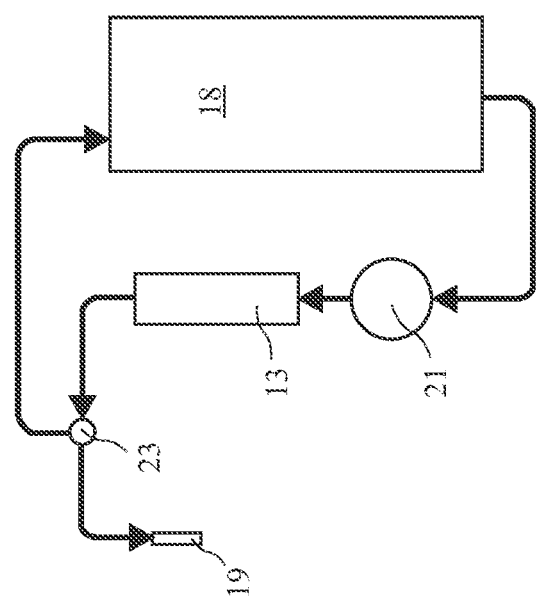
FIG. 2A is a functional diagram of an exemplary beverage brewer according to the invention.
Figure 2:
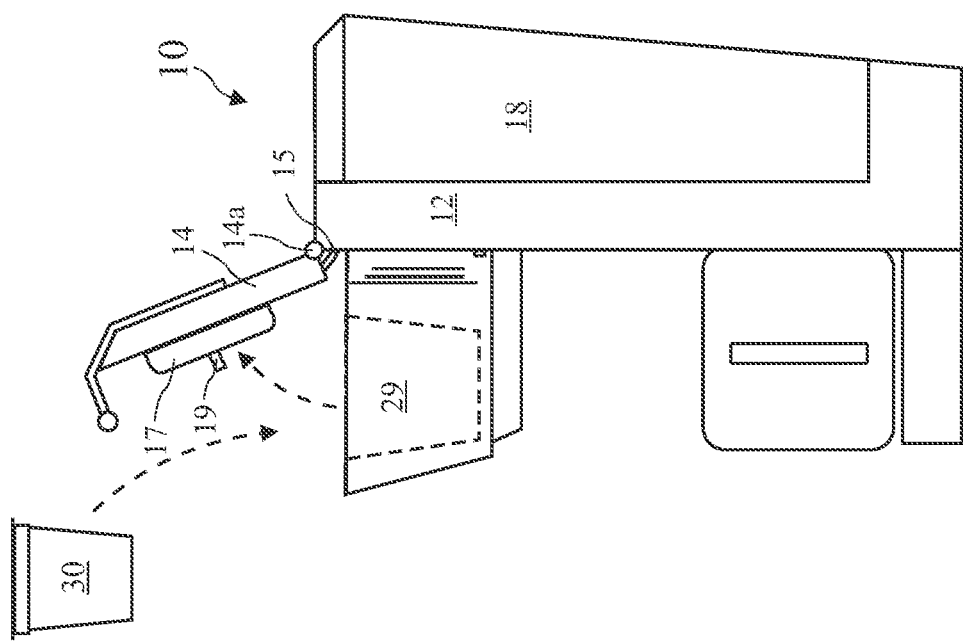
FIG. 2 is a side view of an exemplary beverage brewer according to the invention with an open lid.

Referring to FIG. 2, opening the lid 14 allows access to the brewing chamber 29, into which a brewing cartridge 30 can be placed. The brewing cartridge 30 contains brewing material that will be brewed to make the beverage. The brewing cartridge 30 can be made of a material that allows it to be reusable, although a single-use, disposable cartridge 30 can be used with the brewer 10. In the exemplary embodiment shown, the lid 14 includes a lid hinge 14a, and a water tube 15 carries water from the reservoir 18 into or beneath the lid 14. Preferably, a pad 17 is disposed on a bottom surface of the lid 14 and presses against the brewing cartridge 30 when the lid 14 is closed, urging the brewing cartridge 30 into the brewing chamber 29 and further providing a seal against the brewing cartridge 30. A hollow needle 19, arranged in fluid communication with the water tube 15, extends down from the closed lid 14 and directs the flow of hot water into the brewing cartridge 30.

A functional diagram of the beverage brewer 10 is shown in FIG. 2A. The exemplary beverage brewer 10 includes the water reservoir 18, a water pump 21, a heater 13, a check valve 23, and the needle 19. The pump 21 provides water pressure that enables the water flow, although any means of providing the flow from the reservoir 18 to the needle 19 is contemplated for use with the invention. The water heater 13 can include a heating coil, inductive heating means, a resistive coating, or any other means for heating water. The check valve 23 limits the water pressure at the needle 19 by returning some of the water flow to the water tank 18 if the pressure exceeds a predetermined threshold.

The brewing chamber 29 is preferably configured to accept a sealed, pre-filled brewing cartridge, such as those sold under the trademark K-CUP®. The brewing chamber accepts a top puncture needle for injecting pressurized water into the brewing cartridge, and a bottom puncture needle for puncturing the brewing cartridge to outflow the brewed beverage. Such brewing cartridges are described, for example, in U.S. Pat. No. 5,325,765. As mentioned above, reusable cartridges configured to be used with such brewing chambers can also be used as the cartridge by which a beverage is brewed according to the invention.

Figure 4:
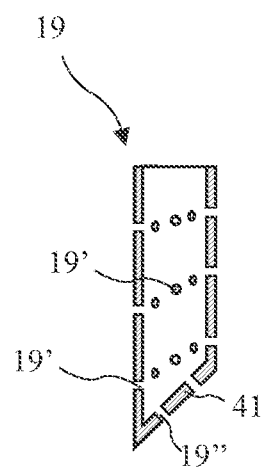
FIG. 4 shows an exemplary injection needle having a plurality of dispersion ports.

An exemplary injection needle 19 having a plurality of dispersion ports 19' is shown in FIG. 4. The injection needle 19 has an angled bottom 41 that also preferably includes angled dispersion ports 19". The injection needle 19 punctures the brewing cartridge 30, receives water from the reservoir via the water tube 15, and disperses sprays of water into brewing material in the brewing cartridge 30 through the ports.

Figure 3:
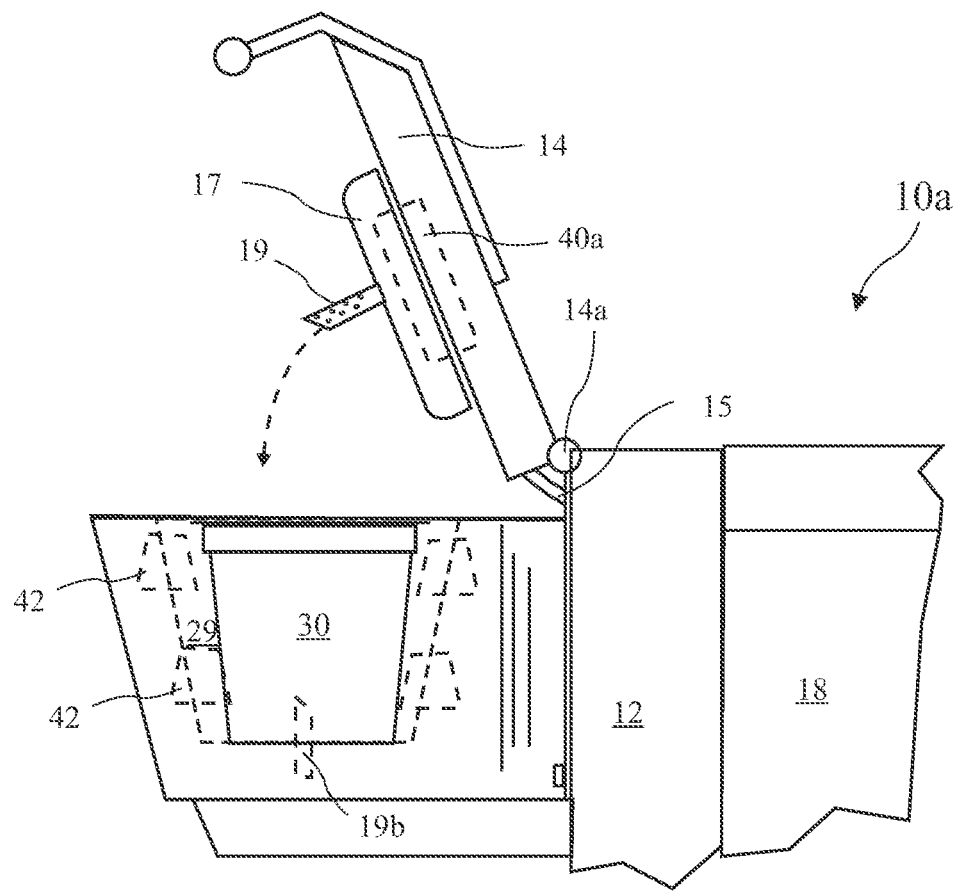
FIG. 3 shows an exemplary beverage brewer according to the invention including a motor in the lid.

In order to distribute the sprayed water more evenly, and to provide centrifugal force on water already within the brewing material, rotation of the brewing cartridge 30 within the chamber 29 is provided. For example, as shown in FIG. 3, a top portion of a beverage brewer 10a includes a motor 40a in the lid 14 that is configured to rotate the brewing cartridge 30. For example, the motor 40a can rotate the pad 17 or some other rotating member pressed against the brewing cartridge 30 when the lid 14 is closed, in order to cause the brewing cartridge 30 to rotate. Rollers 42 are arranged in the brewing chamber 29 to facilitate rotation of the brewing cartridge 30 by providing a rolling contact area that is smaller than the walls of the chamber 29. Preferably, the bottom extraction needle 19b is centered in the brewing chamber 29 to avoid resisting rotation of the brewing cartridge 30.

Figure 5:
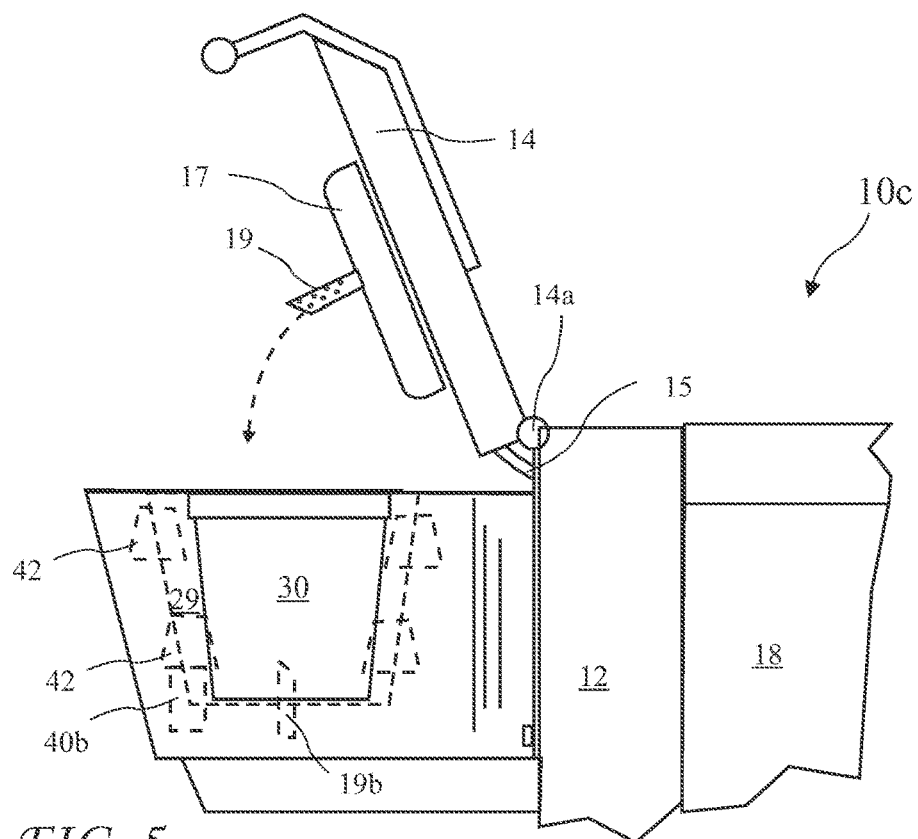
FIG. 5 shows an exemplary beverage brewer according to the invention including a motor connected to rollers.

The embodiment of FIG. 3 is one example of an arrangement configured to rotate the cartridge 30 within the chamber 29, and alternative arrangements can be provided. For example, an exemplary beverage brewer 10c as shown in FIG. 5 includes at least one motor 40b connected to at least one of the rollers 42 at the sides of the brewing chamber 29. The motor 40b directly rotates an associated roller 42 which in turn rotates the cartridge 30 through contact at the outer sidewall of the cartridge 30. Although more than one motor 40b can be used, one motor 40b causing one roller 42 to rotate is adequate to rotate the cartridge 30 within the chamber 29, and the other rollers 42 can passively facilitate rotation as in the embodiment of FIG. 3. Further, the pressure of the passive rollers 42 against the outer sidewalls of the cartridge 30 helps to urge the cartridge 30 against the roller 42 that is rotated by the motor 40b to provide effective contact between the driven roller 42 and the cartridge 30.

Figure 6:
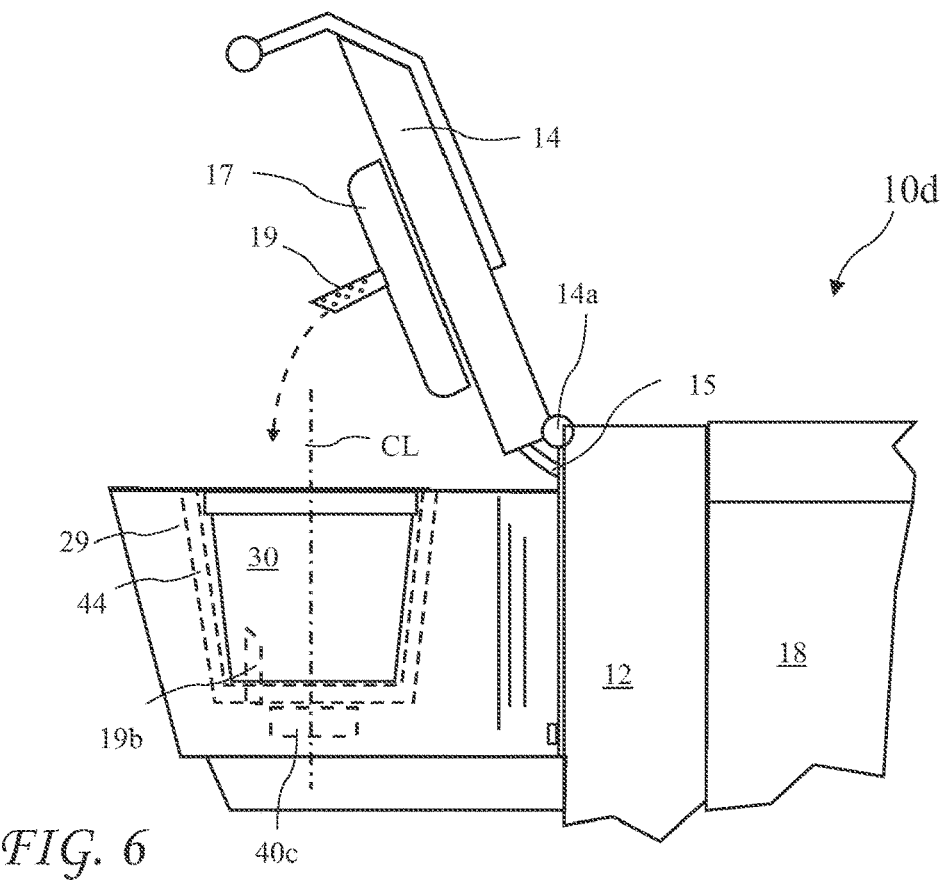
FIG. 6 shows an exemplary beverage brewer according to the invention including a motor configured to rotate a cradle.

As another alternative, the brewer can include a rotatable cradle within the chamber 29 into which the cartridge is placed prior to beginning the brewing process. For example, a beverage brewer 10d including a motor 40c configured to rotate a cradle 44 is shown in FIG. 6. As shown, the cradle 44 is configured to accept the cartridge 30 such that the cartridge 30 is held in a fixed position within the cradle 44, so that the cartridge 30 rotates with rotation of the cradle 44. A bottom extraction needle 19b can be a single needle centered on a centerline CL of the cradle 44 and fixed to the beverage brewer 10d, or the bottom extraction needle 19b can be one or more needles offset from the centerline CL of the cradle 44 and arranged to rotate with the cradle 44.

Thus, generally, the beverage brewer according to the invention includes stationary holding means for receiving and supporting a brewing cartridge, injection means, rotation means arranged at a periphery of the holding means, and a motor configured to rotate the rotation means. The injection means is arranged in fluid communication with a liquid supply means, for entering a brewing cartridge disposed in the holding means and for providing fluid communication from the liquid supply means to an interior of the brewing cartridge. The beverage brewer can also include extraction means arranged opposite an opening of the stationary holding means and configured to enter the brewing cartridge when the brewing cartridge is disposed in the stationary holding means and to provide fluid communication from an interior of the brewing cartridge to an exterior of the stationary holding means. The various means can be embodied according to any of the structure described herein, or any known functional reasonable equivalents thereof.

For example, the beverage brewer can include a brewing chamber, a hollow injection nozzle, a rotation member, and a motor. The brewing chamber is configured to receive and hold a brewing cartridge, whether of the sealed type that is prepackaged with brewing material, or of the reusable type that can be filled with a quantity of brewing material of a user's choosing, including any type of coffee, tea, or herbal material, or any combination of materials. The injection nozzle is arranged in fluid communication with a liquid supply, such as a reservoir or other container, and is configured to enter a brewing cartridge when the brewing cartridge is disposed in the brewing chamber and to provide fluid communication from the liquid supply to an interior of the brewing cartridge.

Thus, the injection nozzle receives water from a reservoir and provides that water to the brewing chamber in order to brew the beverage, preferably when a brewing cartridge containing brewing material is disposed within the brewing chamber. The water can be heated at some point between the reservoir and the brewing chamber, or even in the reservoir itself, by any known heating element, or unheated water can be used for brewing. Any type of cartridge can be used with the beverage brewer of the invention, as long as it can be disposed within the brewing chamber and can receive water from the injection nozzle. The rotation member is arranged at a periphery of the brewing chamber, and the particular location at which point of the periphery depends on the nature of the rotation member, as described below and with respect to the exemplary embodiments described above.

The motor, of any known type, is configured to rotate the rotation member, and arranged with respect to the other elements of the beverage brewer to provide this rotational capability. The motor can be powered via a power source such as an AC power outlet, a DC battery or fuel cell, a solar energy conversion apparatus, or even a hand crank or spring-wound power source. The motor can be actuated by any the user using any known type of switch, or can be actuated automatically when the brewing process is initiated, or according to a programmed sequence as part of an automated process. The speed and direction of the rotation imparted by the motor can also be settable as an optional feature.

Thus, the brewing chamber holds the cartridge, the injection nozzle provides brewing water or other liquid, and the motor imparts motion to the rotation member, which in turn rotates the cartridge while the beverage is brewed. In this way, the beverage brewer can brew a beverage using any type of cartridge in a manner that provides more thorough distribution of brewing water through the brewing material in the cartridge.

The injection nozzle can be any conduit that can be used to transport water from the reservoir to the brewing chamber. For example, the injection nozzle can be a simple plastic, rubber, or metal tube that can enter a cartridge through an opening in the top of the cartridge, such as through the opening in the lid of a reusable beverage cartridge. Alternatively, the injection nozzle can be an injection needle configured to pierce a sealed brewing cartridge when the brewing cartridge is disposed in the brewing chamber. Such an injection needle would be hollow in order to carry the water and would also be pointed in order to be able to pierce the cartridge. Of course, the injection nozzle can be a flexible tube having an injection needle tip, and any configuration that can carry water and enter or pierce the cartridge is contemplated for use as an element of the invention. The injection nozzle can include a sidewall having a number of ports providing fluid communication from a hollow interior of the injection nozzle to space outside of the injection nozzle, in order to provide a spray of water. If the injection nozzle is an injection needle, the point can be configured as a slanted open cut in the sidewall of the needle, or a slanted closed wall, or a slanted wall that is perforated by one or more open ports.

The beverage brewer can also include a hollow extraction nozzle arranged opposite an opening of the brewing chamber and configured to enter the brewing cartridge when the brewing cartridge is disposed in the brewing chamber and to provide fluid communication from an interior of the brewing cartridge to an exterior of the brewing chamber. Similarly to the injection nozzle, the extraction nozzle can be a simple tube configured to enter the cartridge, for example through an opening in the cartridge. Presumably, if the cartridge has a bottom opening, the brewing material is supported within the cartridge by a mesh or otherwise porous element. Alternatively, the extraction nozzle can be, for example, an extraction needle configured to pierce the brewing cartridge when the brewing cartridge is disposed in the brewing chamber. The extraction nozzle might not be necessary, however, if the brewer is to be used with a type of cartridge that includes mesh panels that allow the brewed beverage to flow freely from the cartridge into the brewing chamber, to outflow from the brewing chamber through an outlet.

The nature, arrangement, and design of the rotation member can vary within the scope of the invention. For example, the beverage brewer can also include a lid configured to selectively cover the brewing chamber. In such a case, the rotation member can be a pad attached to the lid and arranged to press on the brewing cartridge when the brewing cartridge is disposed in the brewing chamber and the lid covers the brewing chamber. That is, when the cartridge is in the brewing chamber and the lid is closed, the pad makes contact with the top of the cartridge. Preferably, the surface of the pad is resilient and provides enough friction to an extent that by closing the lid the pad can be pressed against the cartridge with enough compression force that the cartridge will move with movement of the pad. Thus, the pad can be configured to cause the brewing cartridge to rotate within the brewing chamber with rotation of the pad. The motor can be arranged in, on, or under the lid to effectively provide rotational movement to the pad. The injection nozzle can extend through a center of the pad, such as through a central opening in the pad, and into an interior of the brewing chamber when the lid covers the brewing chamber. If an extraction nozzle is included in such an embodiment, it can be centrally disposed with respect to sidewalls of the brewing chamber, so that it does not hinder rotation of the cartridge.

The beverage brewer can also include a roller disposed at a sidewall of the brewing chamber such that at least a portion of the roller extends within an interior of the brewing chamber, arranged to contact the brewing cartridge when the brewing cartridge is disposed in the brewing chamber, and configured to rotate with movement of the brewing cartridge within the brewing chamber. The roller can be, for example, a movable piece mounted loosely on a rod such that the movable piece can rotate freely about the rod. The movable piece of the roller can take any shape suitable for contact with the outer surface of the cartridge. For example, the movable piece can be cylindrical in shape, or can be frustoconical or have ridges, and the surface of the roller can have a suitable amount of friction for providing rolling contact for the cartridge. The beverage brewer can include a number of these rollers, in order to space the cartridge from the inner sidewall of the brewing chamber and to facilitate rotation of the cartridge within the brewing chamber.

Alternatively, the rotation member itself can be a roller that is driven by the motor. The motor can be disposed in this case, for example, in a body of the beverage brewer. A single, driven roller can be provided to rotate the cartridge, or a number of rollers as described above can be included in the brewer. If multiple rollers are provided, a single one of the rollers can be driven to cause rotation of the cartridge while the others are passive to facilitate the rotation, or they can all be driven by the motor, or there can be any combination of driven rollers and passive rollers. In such an embodiment, the extraction nozzle can be centrally disposed with respect to sidewalls of the brewing chamber so as not to hinder rotation.

The beverage brewer can also include a cradle rotatably coupled within the brewing chamber, configured to hold the brewing cartridge stationary within the cradle. The rotation member in this case can be a motor-driven roller as described above. The roller can be configured to contact and rotate the cradle rather than the cartridge, thereby rotating the brewing cartridge inside the cradle within the brewing chamber. The motor can be disposed, for example, in a body of the beverage brewer to drive the roller which in turn rotates the cradle. As described above, there can be more than one driven roller and also one or more passive rollers. Again, the extraction nozzle can be centrally disposed with respect to sidewalls of the brewing chamber, and the cradle can include a bottom opening configured to allow passage of the extraction nozzle.

Alternatively, the rotation member itself can be a cradle that Is driven directly by the motor to rotate within the brewing chamber while holding the cartridge. The motor in this case can be disposed, for example, in a body of the beverage brewer. In such an embodiment, a driven roller is not necessary because the cradle is driven directly, but a driven roller can be used with the driven cradle as well, and one or more passive rollers can also be included to space the cradle from the sidewalls of the brewing chamber, to keep the rotation uniform about a vertical axis, and to facilitate the rotational movement.

As another alternative, the rotation member can be a pad disposed at a surface of the brewing chamber opposite an opening of the brewing chamber and arranged to contact the brewing cartridge when the brewing cartridge is disposed in the brewing chamber. For example, the pad can be arranged on the bottom of the brewing chamber, so that the brewing cartridge is supported by the pad when the cartridge is in the brewing chamber. The pad can be configured to rotate the brewing cartridge within the brewing chamber when driven by the motor, which can be disposed, for example, in a body of the beverage brewer. The extraction nozzle, if included in this embodiment, can be centrally disposed with respect to sidewalls of the brewing chamber, and the pad can include an opening to accommodate the extraction nozzle. As is the case in any of the described embodiments, the beverage brewer can include passive rollers as described above, to space the cartridge from the sidewalls of the brewing chamber, and can also include one or more driven rollers to assist with rotation of the cartridge. Embodiments utilizing the bottom pad can also be used with or without the cradle as described above, which can be attached to the pad or which can rest on the pad as a separate element, but preferably is removably coupled to the pad.

While the invention herein disclosed has been described by means of specific embodiments and applications thereof, numerous modifications and variations could be made thereto by those skilled in the art without departing from the scope of the invention set forth in the claims.

I claim:

1. A beverage brewer, comprising:
    a brewing chamber configured to receive and hold a brewing cartridge;
    a hollow injection nozzle arranged in fluid communication with a liquid supply and configured to enter a brewing cartridge when the brewing cartridge is disposed in the brewing chamber and to provide fluid communication from the liquid supply to an interior of the brewing cartridge;
    a rotation member arranged at a periphery of the brewing chamber;
    a motor configured to rotate the rotation member; and
    a lid configured to selectively cover the brewing chamber;
    wherein the rotation member is a pad attached to the lid and arranged to press on the brewing cartridge when the brewing cartridge is disposed in the brewing chamber and the lid covers the brewing chamber; and
    wherein the pad is configured to cause the brewing cartridge to rotate within the brewing chamber with rotation of the pad.

2. The beverage brewer of claim 1, wherein the motor is disposed in a body of the beverage brewer.

3. The beverage brewer of claim 1, wherein the injection nozzle includes a sidewall having a plurality of ports providing fluid communication from a hollow interior of the injection nozzle to space outside of the injection nozzle.

4. The beverage brewer of claim 1, wherein the injection nozzle is an injection needle configured to pierce a sealed brewing cartridge when the brewing cartridge is disposed in the brewing chamber.

5. The beverage brewer of claim 1, further comprising a hollow extraction nozzle arranged opposite an opening of the brewing chamber and configured to enter the brewing cartridge when the brewing cartridge is disposed in the brewing chamber and to provide fluid communication from an interior of the brewing cartridge to an exterior of the brewing chamber.

6. The beverage brewer of claim 5, wherein the extraction nozzle is an extraction needle configured to pierce a sealed brewing cartridge when the brewing cartridge is disposed in the brewing chamber.

7. The beverage brewer of claim 1, wherein the motor is arranged in the lid.

8. The beverage brewer of claim 1, wherein the injection nozzle extends through the pad and into an interior of the brewing chamber when the lid covers the brewing chamber.

9. A beverage brewer, comprising:
a brewing chamber configured to receive and hold a brewing cartridge;
a hollow injection nozzle arranged in fluid communication with a liquid supply and configured to enter a brewing cartridge when the brewing cartridge is disposed in the brewing chamber and to provide fluid communication from the liquid supply to an interior of the brewing cartridge;
a rotation member arranged at a periphery of the brewing chamber;
a motor configured to rotate the rotation member; and
a roller disposed at a sidewall of the brewing chamber such that at least a portion of the roller extends within an interior of the brewing chamber, is arranged to contact the brewing cartridge when the brewing cartridge is disposed in the brewing chamber, and is configured to rotate with movement of the brewing cartridge within the brewing chamber.

10. The beverage brewer of claim 9, further comprising a plurality of said rollers.

11. The beverage brewer of claim 9, wherein the motor is disposed in a body of the beverage brewer.

12. The beverage brewer of claim 9, wherein the injection nozzle includes a sidewall having a plurality of ports providing fluid communication from a hollow interior of the injection nozzle to space outside of the injection nozzle.

13. The beverage brewer of claim 9, wherein the injection nozzle is an injection needle configured to pierce a sealed brewing cartridge when the brewing cartridge is disposed in the brewing chamber.

14. The beverage brewer of claim 9, further comprising a hollow extraction nozzle arranged opposite an opening of the brewing chamber and configured to enter the brewing cartridge when the brewing cartridge is disposed in the brewing chamber and to provide fluid communication from an interior of the brewing cartridge to an exterior of the brewing chamber.

15. The beverage brewer of claim 14, wherein the extraction nozzle is an extraction needle configured to pierce a sealed brewing cartridge when the brewing cartridge is disposed in the brewing chamber.

16. A beverage brewer, comprising:
a brewing chamber configured to receive and hold a brewing cartridge;
a hollow injection nozzle arranged in fluid communication with a liquid supply and configured to enter a brewing cartridge when the brewing cartridge is disposed in the brewing chamber and to provide fluid communication from the liquid supply to an interior of the brewing cartridge;
a rotation member arranged at a periphery of the brewing chamber; and
a motor configured to rotate the rotation member;
wherein the rotation member is a roller disposed at a sidewall of the brewing chamber such that at least a portion of the roller extends within an interior of the brewing chamber and is arranged to press against the brewing cartridge when the brewing cartridge is disposed in the brewing chamber; and
wherein the roller is configured to contact the brewing cartridge and cause the brewing cartridge to rotate within the brewing chamber.

17. The beverage brewer of claim 16, wherein the rotation member is a plurality of said rollers.

18. The beverage brewer of claim 16, wherein the motor is disposed in a body of the beverage brewer.

19. The beverage brewer of claim 16, wherein the injection nozzle includes a sidewall having a plurality of ports providing fluid communication from a hollow interior of the injection nozzle to space outside of the injection nozzle.

20. The beverage brewer of claim 16, wherein the injection nozzle is an injection needle configured to pierce a sealed brewing cartridge when the brewing cartridge is disposed in the brewing chamber.

21. The beverage brewer of claim 16, further comprising a hollow extraction nozzle arranged opposite an opening of the brewing chamber and configured to enter the brewing cartridge when the brewing cartridge is disposed in the brewing chamber and to provide fluid communication from an interior of the brewing cartridge to an exterior of the brewing chamber.

22. The beverage brewer of claim 21, wherein the extraction nozzle is an extraction needle configured to pierce a sealed brewing cartridge when the brewing cartridge is disposed in the brewing chamber.

23. A beverage brewer, comprising:
a brewing chamber configured to receive and hold a brewing cartridge;
a hollow injection nozzle arranged in fluid communication with a liquid supply and configured to enter a brewing cartridge when the brewing cartridge is disposed in the brewing chamber and to provide fluid communication from the liquid supply to an interior of the brewing cartridge;
a rotation member arranged at a periphery of the brewing chamber;
a motor configured to rotate the rotation member; and
a cradle rotatably coupled within the brewing chamber, configured to hold the brewing cartridge stationary within the cradle;
wherein the rotation member is a roller disposed at a sidewall of the brewing chamber such that at least a portion of the roller extends within an interior of the brewing chamber and is arranged to press against the cradle when the brewing cartridge is disposed in the brewing chamber; and
wherein the roller is configured to contact and rotate the cradle, thereby rotating the brewing cartridge within the brewing chamber.

24. The beverage brewer of claim 23, wherein the cradle includes a bottom opening configured to allow passage of an extraction nozzle.

25. The beverage brewer of claim 23, wherein the motor is disposed in a body of the beverage brewer.

26. The beverage brewer of claim 23, wherein the injection nozzle includes a sidewall having a plurality of ports providing fluid communication from a hollow interior of the injection nozzle to space outside of the injection nozzle.

27. The beverage brewer of claim 23, wherein the injection nozzle is an injection needle configured to pierce a sealed brewing cartridge when the brewing cartridge is disposed in the brewing chamber.

28. The beverage brewer of claim 23, further comprising a hollow extraction nozzle arranged opposite an opening of the brewing chamber and configured to enter the brewing cartridge when the brewing cartridge is disposed in the brewing chamber and to provide fluid communication from an interior of the brewing cartridge to an exterior of the brewing chamber.

29. The beverage brewer of claim 28, wherein the extraction nozzle is an extraction needle configured to pierce a sealed brewing cartridge when the brewing cartridge is disposed in the brewing chamber.

\* \* \* \* \*